United States Patent
Cognon

(10) Patent No.: US 11,786,875 B2
(45) Date of Patent: Oct. 17, 2023

(54) DOSING METHOD AND ASSOCIATED FACILITY

(71) Applicant: EXEL INDUSTRIES, Epernay (FR)

(72) Inventor: Thibault Cognon, Paris (FR)

(73) Assignee: EXEL INDUSTRIES, Epernay (FR)

( * ) Notice: Subject to any disclaimer, the term of this patent is extended or adjusted under 35 U.S.C. 154(b) by 300 days.

(21) Appl. No.: 17/076,756

(22) Filed: Oct. 21, 2020

(65) Prior Publication Data
US 2021/0121841 A1    Apr. 29, 2021

(30) Foreign Application Priority Data

Oct. 24, 2019 (FR) .................................. 1911907

(51) Int. Cl.
| | | |
|---|---|---|
| *B01F 35/221* | (2022.01) | |
| *B01F 23/40* | (2022.01) | |
| *B01F 23/451* | (2022.01) | |
| *B01F 25/31* | (2022.01) | |
| *B01F 35/21* | (2022.01) | |
| *B01F 35/71* | (2022.01) | |

(52) U.S. Cl.
CPC ...... *B01F 35/22162* (2022.01); *B01F 23/451* (2022.01); *B01F 23/49* (2022.01); *B01F 25/31* (2022.01); *B01F 35/21112* (2022.01); *B01F 35/718051* (2022.01); *B01F 2215/0477* (2013.01)

(58) Field of Classification Search
CPC ................................................. B01F 35/22162
USPC ................................ 366/152.2, 152.4, 179.1
See application file for complete search history.

(56) References Cited

U.S. PATENT DOCUMENTS

| | | | |
|---|---|---|---|
| 5,629,863 A | 5/1997 | Palozzi et al. | |
| 5,868,177 A | 2/1999 | Leahy et al. | |
| 6,224,778 B1 * | 5/2001 | Peltzer | C02F 1/008 210/101 |
| 6,799,883 B1 * | 10/2004 | Urquhart | B01F 35/2133 137/3 |
| 7,344,297 B2 * | 3/2008 | Urquhart | G05D 11/138 366/132 |
| 8,123,396 B1 * | 2/2012 | Karpetsky | B01F 35/717551 366/173.1 |
| 9,039,272 B2 * | 5/2015 | Karki | D21H 23/78 366/142 |
| 10,213,757 B1 * | 2/2019 | Lee | E21B 21/062 |

(Continued)

OTHER PUBLICATIONS

INPI Rapport de Recherche Préliminaire for Patent Application No. FR 1911907, dated Sep. 25, 2020, 2 pp.

*Primary Examiner* — David L Sorkin
(74) *Attorney, Agent, or Firm* — Soquel Group LLC

(57) ABSTRACT

A method for dosing an injection product into a base product, in particular, for the production of a finishing and/or protective paint product, including the following steps: (a) supply of a mixing device, (b) establishment of a continuous flow of base product, (c) injection of the injection product into the continuous flow for a given time, (d) measurement of the amount of injection product injected, (e) calculation of a desired amount of base product based on the amount of injection product injected, steps (c), (d) and (e) being repeated when the amount of base product having passed since the start of step (c) is equal to the amount of base product desired, the injection product being injected into the base product only during step (c).

6 Claims, 4 Drawing Sheets

(56) References Cited

U.S. PATENT DOCUMENTS

| | | |
|---|---|---|
| 2003/0071062 A1 | 4/2003 | Miller et al. |
| 2007/0070803 A1* | 3/2007 | Urquhart ............. B01F 35/2132 366/152.4 |
| 2011/0218678 A1 | 9/2011 | Sebben |

\* cited by examiner

DOSING METHOD AND ASSOCIATED FACILITY

CROSS-REFERENCE TO RELATED APPLICATION

This application claims priority of French Patent Application No. 19 11907, filed on Oct. 24, 2019.

FIELD OF THE INVENTION

The present invention relates to a method for dosing an injection product into a base product, in particular for the production of a finishing and/or protective paint product.

The invention further relates to an associated dosing facility.

BACKGROUND OF THE INVENTION

Currently, a continuous flow of base product is generated, with an amount of injection product being injected through an injection valve into the base product at regular intervals depending on the amount of base product having flowed during the previous interval.

This makes it possible to obtain a desired proportion between the base product and the injection product.

However, it is difficult to control the amount of injection product injected.

On the one hand, the duration of injection of the injection product must be adjusted both as a function of the quantity of base product flowing during the interval, as well as a function of the flow rate of the injection product during the injection.

On the other hand, the injection time is typically rather short compared to the mode of operation of the injection valve. Thus, a very fine theoretical adjustment of the injection product duration depending on the amount of base product having flowed through and the flow rate of the injection product may not be implemented correctly at the injection valve.

SUMMARY OF THE DESCRIPTION

An object of the invention is, therefore, to provide a dosing method making it possible to improve the precision of the dosing between the base product and the injection product.

To this end, the invention relates to a dosing method of the aforementioned type, including the following steps:
(a) supply of a device for mixing an injection product and a base product,
(b) setting up a continuous flow of base product in the mixing device, the amount of base product of the continuous flow being measured,
(c) injection of the injection product into the continuous flow of the base product for a given time,
(d) measurement of the amount of injection product injected during the given time,
(e) calculation of a desired amount of base product based on the measured amount of injected injection product,
steps (c), (d) and (e) being repeated when the quantity of base product measured having passed since the start of step (c) is equal to the amount of base product desired,
the injection product being injected into the base product only during step (c).

According to particular embodiments, the method includes one or more of the following characteristics, taken in isolation or in any technically feasible combination:
in step (e), the desired amount of base product is calculated from a desired quantity ratio between the base product and the injection product;
the desired amount of base product is equal to the product of the desired ratio and the amount of injection product injected during the given time;
the given time is between 0.01 and 10 seconds;
the mixing device is supplied with injection product via an injection channel, the injection channel being provided with an injection valve, the injection valve being movable between an open position and a closed position;
the injection valve may be controlled by a computer;
the injection valve is opened at the start of injection step (c) and is closed at the end of injection step (c) after the given time; and
the mixing device is supplied with base product via a base channel, the injection channel being provided with a device for measuring the quantity of injection product passing through the measuring device, the base channel being provided with a device for measuring the quantity of base product passing through the measuring device.

The invention further relates to an installation for dosing an injection product into a base product, in particular for the production of a finishing and/or protective paint product, including at least one device for mixing an injection product and a base product, and including an injection inlet, a base inlet and an outlet for a mixture of the injection product and the base product, the dosing installation being able to implement the dosing method as described above.

The invention also relates to a dosing installation including at least two devices for mixing a respective injection product and a respective base product, in particular for the production of a finishing and/or protective paint product,
each mixing device including an injection product inlet, a base product inlet and an outlet for a mixture of the injection product and the base product,
the outlet of a first of the at least two mixing devices being fluidly connected to the inlet of the base product or of the injection product of a second of the at least two mixing devices,
the dosing installation being able to implement the dosing method as described above.

BRIEF DESCRIPTION OF THE DRAWINGS

The invention will be better understood upon reading the description which follows, given only by way of example and made with reference to the accompanying drawings, in which.

DETAILED DESCRIPTION

The terms "upstream" and "downstream" are understood hereinafter in the usual sense for fluid flow.

Figure 1:
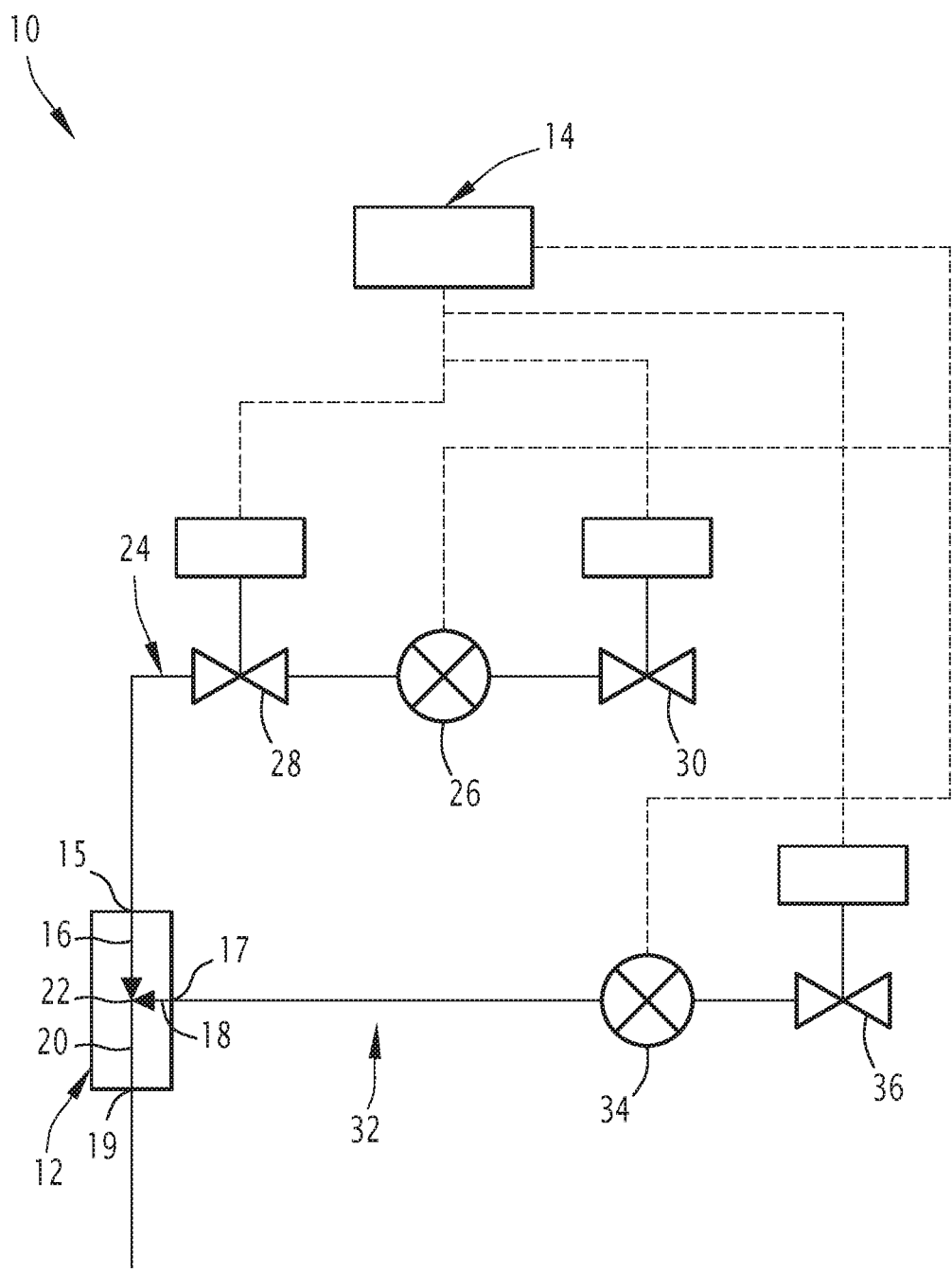
FIG. 1 is a schematic view of a dosing installation according to a first embodiment.

A first example of a dosing installation 10 for injecting an injection product into a base product according to the invention, is shown in FIG. 1.

Such an installation makes it possible to produce a mixture forming a paint or a paint base.

The injection product and the base product are fluid products.

The injection product and the base product have a respective viscosity of between 20 to 5000 centipoise.

Dosing installation 10 includes at least one, here one, device 12 for mixing an injection product and a base product.

Dosing installation 10 further includes a computer 14.

Mixing device 12 includes an injection inlet 15 supplied with injection product.

Mixing device 12 includes an injection line 16 extending from injection inlet 15.

Mixing device 12 includes a base inlet 17 supplied with base product.

Mixing device 12 includes a base line 18 extending from base inlet 17.

Mixing device 12 further includes an outlet 19 provided to allow the outlet of a mixture of the injection product and the base product from mixing device 12.

Mixing device 12 further includes an outlet line 20.

Injection line 16 and base line 18 each extend from the inlet of the respective mixing device 15, 17 to a coincident mixing end 22 for injection line 16 and base line 18.

Outlet line 20 extends from mixing end 22 to outlet 19 of mixing device 12.

Injection line 16 and the base line 18 meet at mixing end 22.

The injection product from injection line 16 and base product from base line 18 combine at mixing end 22 into outlet 20.

Injection inlet 15 is supplied with injection product through an injection channel 24.

Injection channel 24 is provided with a device 26 for measuring the quantity $Q_i$, more particularly the volume quantity, of injection product passing through measuring device 26.

The measurement by measuring device 26 is carried out continuously or regularly, for example at a regular interval less than a frequency of 20 kHz.

Measuring device 26 is here disposed at a distance from valve 28 of less than 100 centimeters.

Measuring device 26 of injection channel 24 is able to transmit the measured quantity to computer 14.

Injection channel 24 is further provided with an injection valve 28 between measuring device 26 and injection inlet 15; i.e. downstream of measuring device 26.

Injection valve 28 is movable between an open position, in which injection product flows through the valve, and a closed position, in which the injection product does not flow through the valve.

Injection valve 28, more particularly movement of injection valve 28 between the open position and the closed position, may be controlled by computer 14.

Injection channel 24 is also here provided with a global injection valve 30 upstream of measuring device 26.

Global injection valve 30 is movable between an open position, in which the injection product flows through the valve, and a closed position, in which the injection product does not flow through the valve.

Global injection valve 30 controls the inlet of injection product into injection channel 24.

Global injection valve 30, more particularly the movement of global injection valve 30 between the open position and the closed position, may be controlled by computer 14.

Base inlet 17 is supplied with base product through base channel 32.

Base channel 32 is provided with a device 34 for measuring the quantity $Q_b$, more particularly the volume quantity, of base product passing through measuring device 34.

The measurement by measuring device 34 is performed continuously or regularly, for example, at a regular interval lower than a frequency of 20 kHz.

Measuring device 34 is able to transmit the measured quantity to computer 14.

Base channel 32 is here devoid of a valve between measuring device 34 and base inlet 17, i.e., downstream of measuring device 34.

Base channel 32 is also here provided with a global base valve 36 upstream of measuring device 34.

Global base valve 36 is movable between an open position, in which the base product flows through the valve, and a closed position, in which the base product does not flow through the valve.

Global base valve 36, more particularly, movement of global base valve 36 between the open position and the closed position, may be controlled by the computer 14.

Global base valve 36 controls the inlet of base product into base channel 32.

Figure 2:
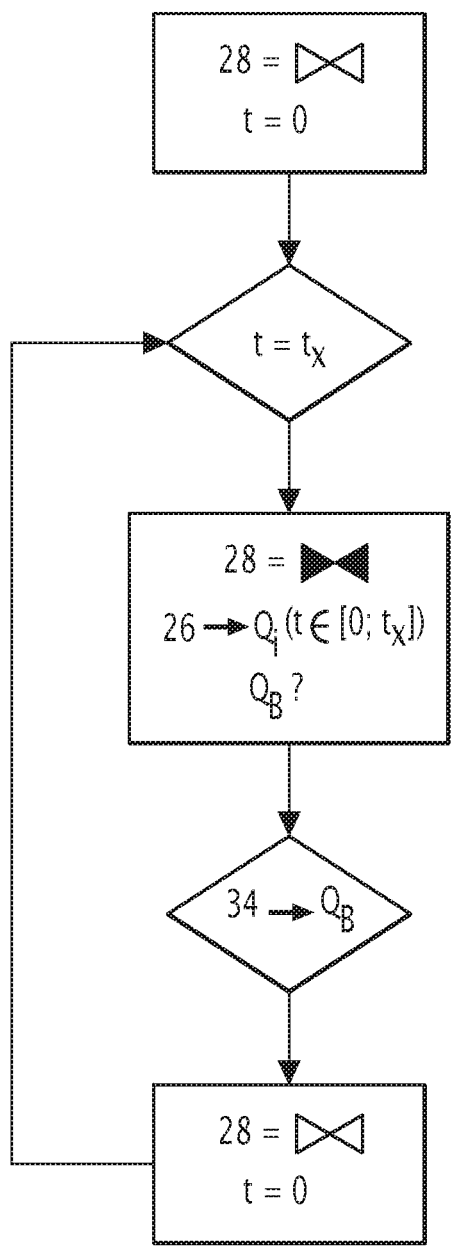
FIG. 2 is a flowchart of a dosing method according to a first embodiment, able to be implemented by the dosing installation of FIG. 1.

A method for dosing an injection product into a base product, in particular for the production of a finishing and/or protective paint product, according to a first embodiment will now be described with reference to FIG. 2.

The dosing method according to this first embodiment is suitable for being implemented by the dosing installation described above.

A device 12 for mixing an injection product and a base product, more particularly, a dosing installation 10 as described above, is provided.

The dosing method is implemented here via computer 14.

Computer 14 includes a clock t.

Global injection valve 30 and global base valve 36 are in their respective open positions.

Injection valve 28 is initially in its closed position.

A continuous flow of base product is set up, more particularly in base line 18 of mixing device 12 via the base channel 32.

The continuous flow of base product is at a flow rate between 2 ml/min to 10 l/min.

The amount of base product of the continuous flow is measured via measuring device 34 of base channel 32.

The measurement by measuring device 34 is carried out continuously or regularly, for example, at a regular interval lower than a frequency of 20 kHz.

At the start of an injection step, injection valve 28 is moved to the open position, more particularly via computer 14.

Some injection product is injected into the continuous flow of base product, more specifically at mixing end 22, during the injection step.

Injection valve 28 is moved to the closed position after a given time $t_x$.

Some injection product is injected into the continuous flow of base product for the given time $t_x$, here corresponding to the injection step.

The given time $t_x$ is between 0.01 and 10 seconds.

More particularly, when injection valve 28 is moved to the open position, computer 14 sets clock t to zero.

When clock t reaches the value of the given time $t_x$, injection valve 28 is moved to the closed position. Thus, only the continuous flow of the base product then flows.

Alternatively, clock t is not set at the start of the injection step, computer 14 detecting the increase in clock t by a variation G since the start of the injection step.

Measuring device 26 of injection channel 24 provides measurement of the quantity of injection product which has passed through measuring device 26 during the injection step, i.e. during the given time $t_x$: $Q_i(t \in [0; t_x])$.

It is considered that the amount of injection product that has passed through measuring device 26 during the injection step is equal to the amount of injection product that has been injected into the continuous flow of base product at the same time.

In particular, the injection product is not compressible under normal conditions of use. In addition, there is no leakage of injection product between measuring device 26 and the mixing end.

The measurement provides the amount of injection product that has been injected into the continuous flow of base product.

A desired amount of base product is calculated based on the amount of injection product injected during the given time $Q_i(t \in [0; t_x])$.

More particularly, a desired quantity ratio between the base product and the injection product, more particularly the base product over the injection product, is predetermined or programmed beforehand.

For example, the B:I ratio of the desired amount of base product to injection product is greater than or equal to 2.

The desired amount of base product $Q_B$ is then equal to the product of the desired B:I ratio and the amount of injection product injected during the given time $Q_i(t \in [0; t_x])$.

We then Write:

$$Q_B = B:I \times Q_i(t \in [0; t_x]) \quad (1)$$

When the amount of base product measured by measuring device 34 from the start of the injection step is equal to $Q_B$, then the dosing method begins again at the start of the injection step.

It is considered that the amount of base product measured by measuring device 34 corresponds to the amount of base product having flowed in the continuous flow.

In particular, the base product is not compressible under normal conditions of use. In addition, there is no base product leakage between measuring device 34 and the mixing end.

In one embodiment, the measurement of the amount of base product flowing through measuring device 34 is performed at regular intervals. It is then considered that the quantity of base product measured by measuring device 34 from the start of the injection step is equal to $Q_B$, when the latter is in fact equal to $Q_B$ or to the first measurement for which the measured quantity is greater than $Q_B$, meaning that the value $Q_B$ has just been exceeded.

Thus, the dosing method includes an iteration of the following steps:
- injection of the injection product into the continuous flow of base product for the given time $t_x$,
- measurement of the quantity of injection product injected during the given time $t_x$,
- calculation of the amount of base product desired according to the amount of injection product injected, and
- flow of the continuous flow alone until the amount of base product having flowed since the start of the iteration is equal to the amount of base product desired.

At the start of each iteration of the injection step, injection valve 28 is moved to the open position for the given time $t_x$. In the embodiment shown, the clock of computer 14 is reset on each iteration.

The given time $t_x$ is identical for all iterations.

The injection product is injected into the base product only during the injection steps.

The steps are repeated successively as long as a user wishes to mix the base product and the injection product.

Thus, at each iteration, an amount $Q_i(t \in [0; t_x])$ of injection product is injected in an amount $Q_B$ of base product which has flowed in the continuous flow.

For each iteration, a quantity ratio is therefore obtained between the base product and the injection product equal to the desired ratio B:I.

In addition, this method allows precise dosing as the duration of the injection step is fixed and does not require an adjustment at each iteration of the duration of the valve opening.

Figure 3:
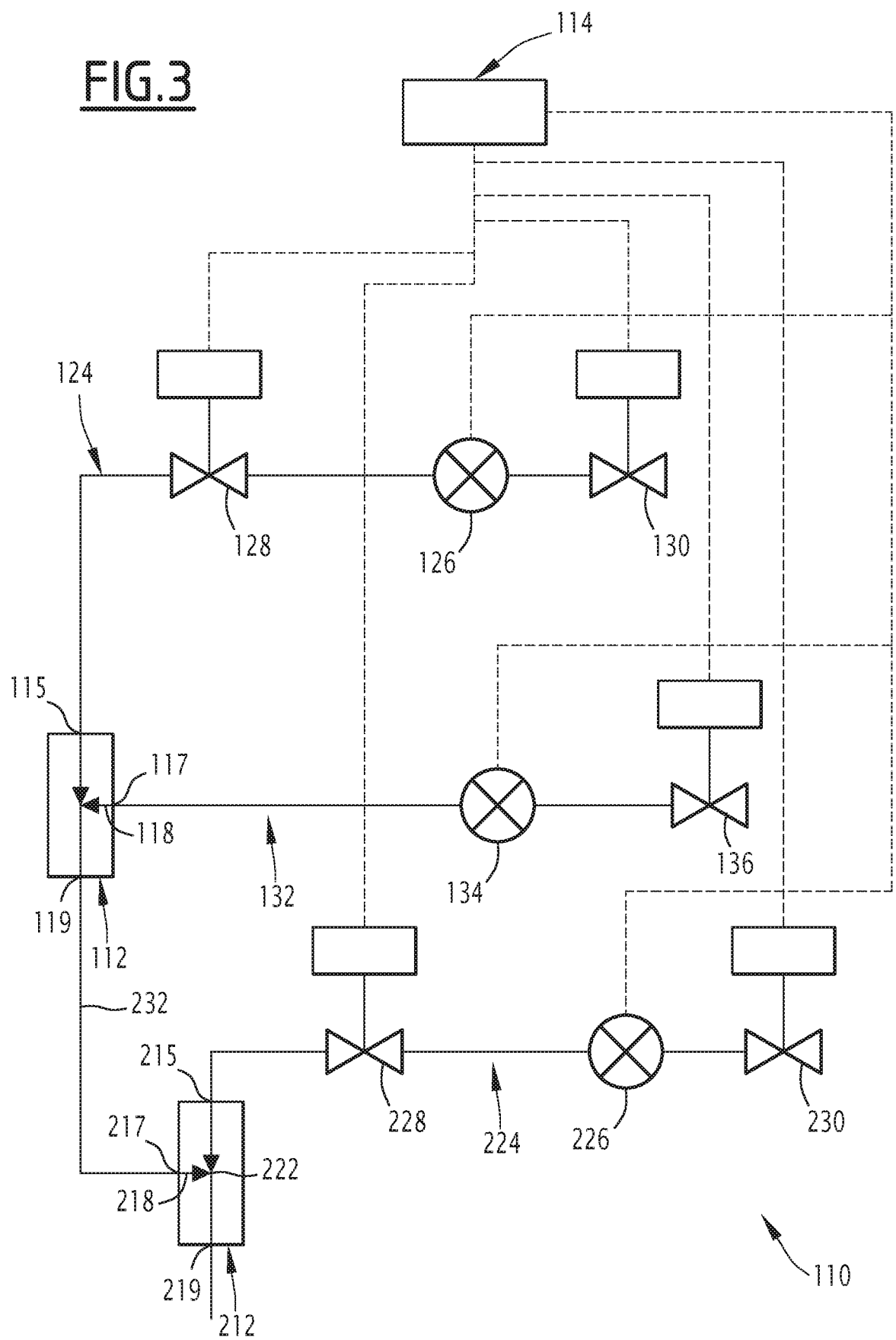
FIG. 3 is a schematic view of a dosing installation according to a second embodiment.

A second embodiment of a dosing installation according to the invention will now be described with reference to FIG. 3.

Dosing installation 110 includes here at least two, more particularly here two, mixing devices 112, 212 of a respective injection product and a respective base product.

Dosing installation 110 further includes a computer 114.

Each mixing device 112, 212 includes an injection product inlet 115, 215, a base product inlet 117, 217 and an outlet 119, 219 for a mixture of the injection product and the base product.

Each of the mixing devices 112, 212 is identical to the mixing device described with regard to the first embodiment.

A first of mixing devices 112 is supplied via injection product 124 and base product 132 channels similar to those described with regard to the first embodiment.

More particularly, injection channel 124 is provided with a device 126 for measuring the quantity of injection product passing through it, with an injection valve 128 downstream of measuring device 126 and, in the present example, a global injection valve 130 upstream of measuring device 126.

Base channel 132 is further provided with a device 134 for measuring the quantity of base product passing through it and, in the present example, with a global base valve 136 upstream of measuring device 134.

The outlet 119 of the first mixing device 112 is here fluidly connected to base product inlet 217 of the second of mixing devices 212.

More particularly, an intermediate channel 232 connects outlet 119 of first mixing device 112 and base product inlet 217 of the second of mixing devices 212.

Injection product inlet 215 of the second mixing device 212 is supplied by a second injection channel 224.

Second injection channel 224 is here similar to that described with regard to the first embodiment of the installation.

More particularly, second injection channel 224 is provided with a device 226 for measuring the quantity of injection product passing through it, with an injection valve 228 downstream of measuring device 226 and, in the present example, a global injection valve 230 upstream of measuring device 226.

All of valves 128, 130, 136, 228, 230, more particularly their respective displacement between an open position and a closed position, of the dosing installation, is here controllable by computer 114.

All of measuring devices 126, 134, 226 are able to transmit the respective measured quantity to computer.

Figure 4:
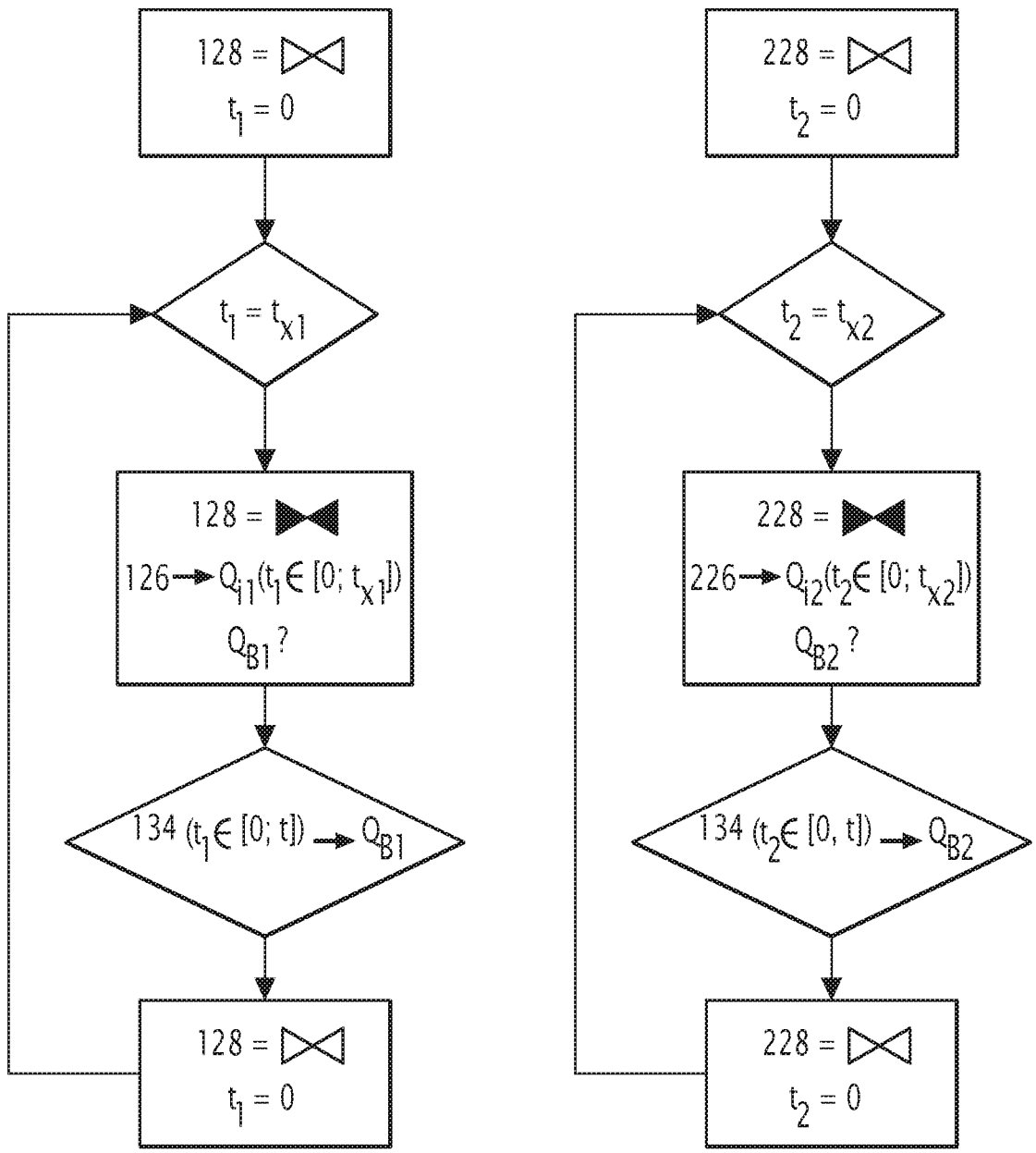
FIG. 4 is a flowchart of a dosing method according to a second embodiment, able to be implemented by the dosing installation of FIG. 3.

A dosing method according to a second embodiment will now be described with reference to FIG. 4.

The dosing method according to this second embodiment is suitable for being implemented by the dosing installation described above according to the second embodiment.

A dosing installation 110 as described with reference to the second embodiment is provided.

Dosing installation 110 is here supplied with a base product, a first injection product and a second injection product.

More particularly, first mixing device 112 is supplied with base product at its base product inlet 117 and with first injection product at its injection product inlet 115. Second mixing device 212 is supplied with product of the second injection at its injection product inlet 215.

The dosing method is implemented here via computer 114.

Computer 114 here comprises two clocks $t_1$, $t_2$.

Global valves 130, 136, 230 are in the respective open position.

Injection valves 128, 228 are, for example, initially in the closed position.

The dosing of the injection of the first injection product into the base product is carried out in first mixing device 112.

The dosing of the first injection product into the base product is hereinafter called the first dosing.

The first dosing is carried out according to the dosing method described with regard to the first embodiment.

The first dosing is implemented by computer 114, more particularly by using a first of the two clocks $t_1$.

Each step of injecting the first injection product into the base product of the iteration is performed for a first given time $t_{x1}$.

An intermediate product mixture consisting of the first injection product and the base product, therefore, leaves first mixing device 112 through outlet 119.

The intermediate product mixture supplies base inlet 217 of second mixing device 212 via intermediate product channel 232.

In parallel, a dosing of the injection of the second injection product into the intermediate product mixture is carried out in second mixing device 212.

The dosing of the second injection product in the intermediate product mixture is hereinafter called the second dosing.

A continuous flow of intermediate product mixing is set up, more particularly in base line 218 of second mixing device 212.

The second dosing is carried out according to the dosing method described with regard to the first embodiment, considering intermediate channel 232 as the base channel of second mixing device 212.

The second dosing is implemented by computer 114, more particularly by using the second of the two clocks, $t_2$.

Each step of injecting the product from the second injection into the base product of the iteration is carried out for a second given time $t_{x2}$.

The second given time $t_{x2}$ is, for example, equal to the first given time $t_{x1}$. Alternatively, the second given time $t_{x2}$ may differ from the first given time $t_{x1}$.

During the calculation step, a desired base amount is calculated based on the amount of first injection product injected during the given time $$Q_{i2}(t_2 \in [0; t_{x2}]).$$

More particularly, a desired quantity ratio between the base product and the second injection product, more particularly the base product over the second injection product, is predetermined or programmed beforehand.

For example, the ratio $B:I_2$ of the desired amount of the base product to the injection product is greater than or equal to 2.

The desired quantity of base product $Q_{B2}$ is then equal to the product of the desired ratio $B:I_2$ and of the quantity of second injection product injected during the given time $Q_{i2}(t_2 \in [0; t_{x2}])$.

We then Write:

$$Q_{B2} = B:I_2 \times Q_{i2}(t_2 \in [0; t_{x2}]) \quad (2)$$

When the amount of base product measured by measuring device 134 from the start of the second injection step is equal to $Q_{B2}$, the second dosing method begins again at the start of the second injection step.

The steps are repeated as long as a user desires the given mixture of the base product, the first injection product and the second injection product.

Alternatively, a desired quantity ratio between the intermediate product mixture and the second injection product is known. During the calculation step, the desired amount of intermediate product mixture is then calculated. The second dosing method then begins again at the start of the second injection step when the sum of the quantity of base product measured by measuring device 134 from the start of the second injection step, and of the quantity of first product measured by measuring device 126 from the start of the second injection step, is equal to the calculated value.

A dosing of the first injection product is performed in first mixing device 112 and a dosing of the second injection product is performed in second mixing device 212.

At each iteration of the step of injecting the first product, a quantity $Q_{i1}(t_1 \in [0; t_{x1}])$ of first injection product is injected in a quantity $Q_{B1}$ of base product having flowed through in the continuous flow of the base product.

At each iteration of the step of injecting the second product, a quantity $Q_{i2}(t_2 \in [0; t_{x2}])$ of the second injection product is injected in a quantity $Q_{B2}$ of base product having flowed through in the continuous flow of intermediate mixture.

In an alternative embodiment not shown, outlet 119 of first mixing device 112 is fluidly connected to injection inlet 215 of second mixing device 112 by a channel. The channel then has an injection valve. Base inlet 217 is then supplied by a second base channel similar to first base channel 124. The dosing of the injection of the intermediate product into the second base product is then similar to what was described previously in the first embodiment by considering the intermediate product mixture as the injection product.

In the example shown opposite the second embodiment, two mixing devices are shown. However, it is understood that this may be generalized in the form of an installation including a number distinctly greater than two mixing devices and to an associated method.

The mixing devices are, for example, arranged in series in a direction of flow, one after the other. The outlet of each mixing device, except for the last according to the direction of flow, is connected to one of the inlets of the next mixing device according to the direction of flow. The other of the inlets of each mixing device is, for example, fed via a respective supply channel.

The dosing installation is able to implement the dosing method as described above, independently considering the dosing of successive injections.

Such a dosing installation is, for example, controlled by a single computer.

For each iteration of the injection step of the dosing method, a quantity ratio is obtained between the base product and the respective injection product equal to the desired ratio.

Thus, each injection product is metered as desired into the base product.

In addition, this method allows precise dosing as the duration of the injection step is fixed and does not require an adjustment at each iteration of the duration of the valve opening.

The invention claimed is:

1. A method of dosing an injection product into a base product, comprising:
   supplying a mixing device of the injection product and the base product, the mixing device being supplied with the injection product through an injection channel, the injection channel being provided with an injection valve, the injection valve being movable between an open position and a closed position;
   setting up a continuous flow of base product in the mixing device, the quantity of the base product flowing in the continuous flow being measured;
   injecting the injection product into the continuous flow of the base product for a given time, wherein the injection valve is opened at the start of said injecting and is closed at the end of said injecting after the given time;
   measuring the quantity of injection product injected during the given time; and
   calculating a desired quantity of the base product as a function of the quantity of the injected injection product measured, said injecting, said measuring and said calculating being repeated when the measured quantity of the base product having flowed since the start of said injecting is equal to the desired quantity of the base product, the injection product being injected into the base product only during said injecting.

2. The dosing method according to claim 1, wherein, said calculating comprises calculating the desired quantity of the base product from a desired amount ratio between the base product and the injection product.

3. The dosing method according to claim 2, wherein the desired quantity of the base product is equal to the product of the desired ratio and the quantity of the injection product injected during the given time.

4. The dosing method according to claim 1, wherein the given time is between 0.01 and 10 seconds.

5. The dosing method according to claim 1, wherein the injection valve is controllable by a computer.

6. The dosing method according to claim 1, wherein the mixing device is supplied with the base product by a base channel, the injection channel being provided with a measuring device for the quantity of the injection product passing through the measuring device, the base channel being provided with a measuring device to measure the quantity of the base product passing through the measuring device.

* * * * *